US008744466B2

(12) United States Patent
Hirano et al.

(10) Patent No.: US 8,744,466 B2
(45) Date of Patent: Jun. 3, 2014

(54) SENSING RF ENVIRONMENT TO MANAGE MOBILE NETWORK RESOURCES

(75) Inventors: Mike Hirano, Redmond, WA (US); M. Sue McMeekin, Snohomish, WA (US); Donald P. Wahlstrom, Woodinville, WA (US); Yan Zhang, Bellevue, WA (US)

(73) Assignee: Broadcom Corporation, Irvine, CA (US)

( * ) Notice: Subject to any disclaimer, the term of this patent is extended or adjusted under 35 U.S.C. 154(b) by 1161 days.

(21) Appl. No.: 11/645,113

(22) Filed: Dec. 21, 2006

(65) Prior Publication Data
US 2008/0085720 A1    Apr. 10, 2008

(51) Int. Cl.
*H04W 72/00* (2009.01)

(52) U.S. Cl.
USPC .............. 455/452.1; 455/63.3; 455/449

(58) Field of Classification Search
USPC ................ 455/452.1, 63.1, 63.3, 446–449
See application file for complete search history.

(56) References Cited

U.S. PATENT DOCUMENTS

| | | | |
|---|---|---|---|
| 5,212,684 A * | 5/1993 | MacNamee et al. | 370/280 |
| 5,212,831 A | 5/1993 | Chuang et al. | |
| 5,276,905 A | 1/1994 | Hurst et al. | |
| 5,535,259 A | 7/1996 | Dent et al. | |
| 5,822,698 A * | 10/1998 | Tang et al. | 455/447 |
| 6,028,853 A | 2/2000 | Haartsen | |
| 6,104,922 A | 8/2000 | Baumann | |
| 6,223,031 B1 * | 4/2001 | Naslund | 455/423 |
| 6,243,575 B1 | 6/2001 | Ohyama et al. | |
| 6,285,874 B1 | 9/2001 | Magnussen et al. | |
| 6,351,643 B1 * | 2/2002 | Haartsen | 455/450 |
| 6,405,048 B1 | 6/2002 | Haartsen | |
| 6,466,938 B1 | 10/2002 | Goldberg | |
| 6,647,000 B1 | 11/2003 | Persson et al. | |
| 6,810,252 B1 | 10/2004 | Kwon | |
| 6,888,817 B1 | 5/2005 | Shyy et al. | |
| 6,950,667 B2 | 9/2005 | Roy et al. | |
| 6,999,725 B2 | 2/2006 | Nitta et al. | |
| 7,324,813 B2 | 1/2008 | Mountney et al. | |
| 7,356,389 B2 | 4/2008 | Holst et al. | |
| 7,363,043 B2 | 4/2008 | Jaeckle et al. | |
| 7,412,248 B2 | 8/2008 | McNew et al. | |
| 7,498,984 B2 | 3/2009 | Taniguchi | |
| 7,944,823 B1 * | 5/2011 | Bordonaro et al. | 370/230 |
| 8,155,680 B2 | 4/2012 | Hirano et al. | |
| 8,280,366 B2 | 10/2012 | Hirano et al. | |

(Continued)

FOREIGN PATENT DOCUMENTS

WO    WO 2005/120101 A1    12/2005

OTHER PUBLICATIONS

Matthew M-L Cheng and Justin C-I Chuang, "Distributed Measurement-based Quasi-fixed Frequency Assignment for Personal Communications," *IEEE*, pp. 433-437, Feb. 1995.

(Continued)

*Primary Examiner* — Vladimir Magloire
(74) *Attorney, Agent, or Firm* — Sterne, Kessler, Goldstein & Fox P.L.L.C.

(57) ABSTRACT

Using radio frequency sensing to manage a mobile network resource is disclosed. A radio frequency environment is sensed to detect one or more base transceiver stations. A resource assignment, such as a frequency or channel assignment, is determined based at least in part on the sensed radio frequency environment.

22 Claims, 7 Drawing Sheets

(56) References Cited

U.S. PATENT DOCUMENTS

| | | | |
|---|---|---|---|
| 2001/0019957 A1* | 9/2001 | Kusaki et al. | 455/436 |
| 2002/0111163 A1 | 8/2002 | Hamabe | |
| 2002/0196781 A1 | 12/2002 | Salovuori | |
| 2003/0003874 A1 | 1/2003 | Nitta et al. | |
| 2003/0022675 A1 | 1/2003 | Mergler | |
| 2003/0054838 A1 | 3/2003 | Carrez | |
| 2003/0058976 A1 | 3/2003 | Ohta et al. | |
| 2003/0069030 A1* | 4/2003 | Mukherjee | 455/461 |
| 2003/0181160 A1 | 9/2003 | Hirsch | |
| 2003/0220102 A1* | 11/2003 | Kallio | 455/422.1 |
| 2004/0116133 A1 | 6/2004 | Kalhan et al. | |
| 2004/0132464 A1 | 7/2004 | Poykko et al. | |
| 2004/0152478 A1 | 8/2004 | Ruohonen et al. | |
| 2004/0204097 A1 | 10/2004 | Scheinert et al. | |
| 2004/0233889 A1 | 11/2004 | Fujita et al. | |
| 2005/0014516 A1 | 1/2005 | Rached et al. | |
| 2005/0030935 A1 | 2/2005 | Seisenberger et al. | |
| 2005/0037775 A1 | 2/2005 | Moeglein et al. | |
| 2005/0130644 A1 | 6/2005 | Bassompierre et al. | |
| 2005/0148368 A1 | 7/2005 | Scheinert et al. | |
| 2005/0207334 A1 | 9/2005 | Hadad | |
| 2005/0219000 A1 | 10/2005 | Wu | |
| 2005/0226152 A1 | 10/2005 | Stephens et al. | |
| 2005/0255890 A1 | 11/2005 | Nakada | |
| 2006/0003775 A1 | 1/2006 | Bull et al. | |
| 2006/0009191 A1 | 1/2006 | Malone, III | |
| 2006/0009210 A1* | 1/2006 | Rinne et al. | 455/423 |
| 2006/0019701 A1* | 1/2006 | Ji | 455/553.1 |
| 2006/0088023 A1 | 4/2006 | Muller | |
| 2006/0121916 A1 | 6/2006 | Aborn et al. | |
| 2006/0211431 A1 | 9/2006 | Mansour et al. | |
| 2007/0021122 A1 | 1/2007 | Lane et al. | |
| 2007/0097939 A1* | 5/2007 | Nylander et al. | 370/338 |
| 2007/0111737 A1 | 5/2007 | Swope et al. | |
| 2007/0150565 A1 | 6/2007 | Ayyagari et al. | |
| 2008/0002658 A1 | 1/2008 | Soliman | |
| 2008/0085699 A1 | 4/2008 | Hirano et al. | |

OTHER PUBLICATIONS

International Preliminary Report on Patentability directed to related International Application No. PCT/US07/21358, mailed on Apr. 15, 2009; 5 pages.

International Preliminary Report on Patentability directed to related International Application No. PCT/US07/21358, mailed on Apr. 15, 2009; 1 page.

European Search Report directed to related European Patent Application No. 07852542.5-1854, mailed May 22, 2013; 8 pages.

International Search Report directed to related International Applicatgion No. PCT/US07/21463, mailed on Apr. 2, 2008; 1 page.

International Preliminary Report on Patentability directed to related International Application No. PCT/US07/21463, mailed on Apr. 15, 2009; 6 pages.

International Search Report directed to related International Application No. PCT/US07/021462, mailed on Mar. 13, 2008; 1 page.

International Search Report directed to related International Application No. PCT/US07/21591, mailed on Mar. 18, 2008; 2 pages.

International Preliminary Report on Patentability directed to related International Application No. PCT/US07/21591, mailed on Apr. 15, 2009; 5 pages.

Non-Final Rejection mailed Jul. 22, 2009 for U.S. Appl. No. 11/645,157, filed Dec. 21, 2006; 16 pages.

Final Rejection mailed Sep. 2, 2010 for U.S. Appl. No. 11/645,157, filed Dec. 21, 2006; 15 pages.

Non-Final Rejection mailed Feb. 17, 2010 for U.S. Appl. No. 11/645,157, filed Dec. 21, 2006; 13 pages.

Non-Final Rejection mailed Feb. 18, 2011 for U.S. Appl. No. 11/645,157, filed Dec. 21, 2006; 18 pages.

Final Rejection mailed Oct. 27, 2011 for U.S. Appl. No. 11/645,157, filed Dec. 21, 2006; 17 pages.

Non-Final Rejection mailed Mar. 20, 2012 for U.S. Appl. No. 11/645,157, filed Dec. 21, 2006; 22 pages.

Notice of Allowance mailed Jun. 7, 2012 for U.S. Appl. No. 11/645,157, filed Dec. 21, 2006; 16 pages.

Non-Final Rejection mailed Mar. 29, 2010 for U.S. Appl. No. 11/645,118, filed Dec. 21, 2006; 12 pages.

Final Rejection mailed Sep. 10, 2010 for U.S. Appl. No. 11/645,118, filed Dec. 21, 2006; 14 pages.

Non-Final Rejection mailed Mar. 1, 2011 for U.S. Appl. No. 11/645,118, filed Dec. 21, 2006; 18 pages.

Notice of Allowance mailed Oct. 25, 2011 for U.S. Appl. No. 11/645,118, filed Dec. 21, 2006; 14 pages.

Non-Final Rejection mailed Jul. 19, 2010 for U.S. Appl. No. 11/645,121, filed Dec. 21, 2006; 18 pages.

Non-Final Rejection mailed Mar. 31, 2011 for U.S. Appl. No. 11/645,121, filed Dec. 21, 2006; 18 pages.

Non-Final Rejection mailed Oct. 18, 2011 for U.S. Appl. No. 11/645,121, filed Dec. 21, 2006; 17 pages.

Final Rejection mailed Jul. 18, 2012 for U.S. Appl. No. 11/645,121, filed Dec. 21, 2006; 9 pages.

Non-Final Rejection mailed Oct. 24, 2012 for U.S. Appl. No. 11/645,121, filed Dec. 21, 2006; 4 pages.

Notice of Allowance mailed May 13, 2013 for U.S. Appl. No. 11/645,121, filed Dec. 21, 2006; 6 pages.

Notice of Allowance mailed Aug. 29, 2013 for U.S. Appl. No. 11/645,121, filed Dec. 21, 2006; 12 pages.

Mayank Tayal, 2005, IEEE, *Location Services in the GSM and UMTS networks*, pp. 1-6.

3GPP TS 04.35 V8.4.1 (May 2002), *Broadcast Network Assistance for E-OTD and GPS positioning methods*, pp. 1-35.

* cited by examiner

SENSING RF ENVIRONMENT TO MANAGE MOBILE NETWORK RESOURCES

CROSS REFERENCE TO OTHER APPLICATIONS

This application claims priority to U.S. Provisional Patent Application No. 60/850,872 entitled Method of RF Monitoring, filed Oct. 10, 2006, which is incorporated herein by reference for all purposes.

BACKGROUND OF THE INVENTION

In a traditional mobile telecommunication network, mobile stations (e.g., mobile phones) communicate via an air link with a stationary base transceiver station (BTS), typically a tower or other structure with one or more antennas and associated radio transceivers. A traditional BTS typically relays data between mobile stations and the core mobile network via a dedicated communication link to a base station controller (BSC). However, smaller base transceiver stations have been developed, e.g., for personal use in the home, dedicated use by a small business or other enterprise, dedicated or additional coverage for areas with high user density or demand (such as airports), etc. Such smaller base transceiver stations are sometimes referred to herein and in the industry by a variety of terms, depending on their size and configuration, including without limitation by terms such as "micro-BTS", "pico-BTS", and "femto-BTS", which terms distinguish such smaller installations from a traditional "BTS", which is sometimes referred to as a "macro-BTS" deployed to serve an associated "macro-cell". Deployment of such smaller base transceiver stations poses challenges to mobile telecommunications network operators and equipment providers, including the need for efficient ways to assign resources to such base transceiver stations (e.g., broadcast channels/frequencies) that does not result in such installations interfering with other network elements.

BRIEF DESCRIPTION OF THE DRAWINGS

Various embodiments of the invention are disclosed in the following detailed description and the accompanying drawings.

DETAILED DESCRIPTION

Figure 1:
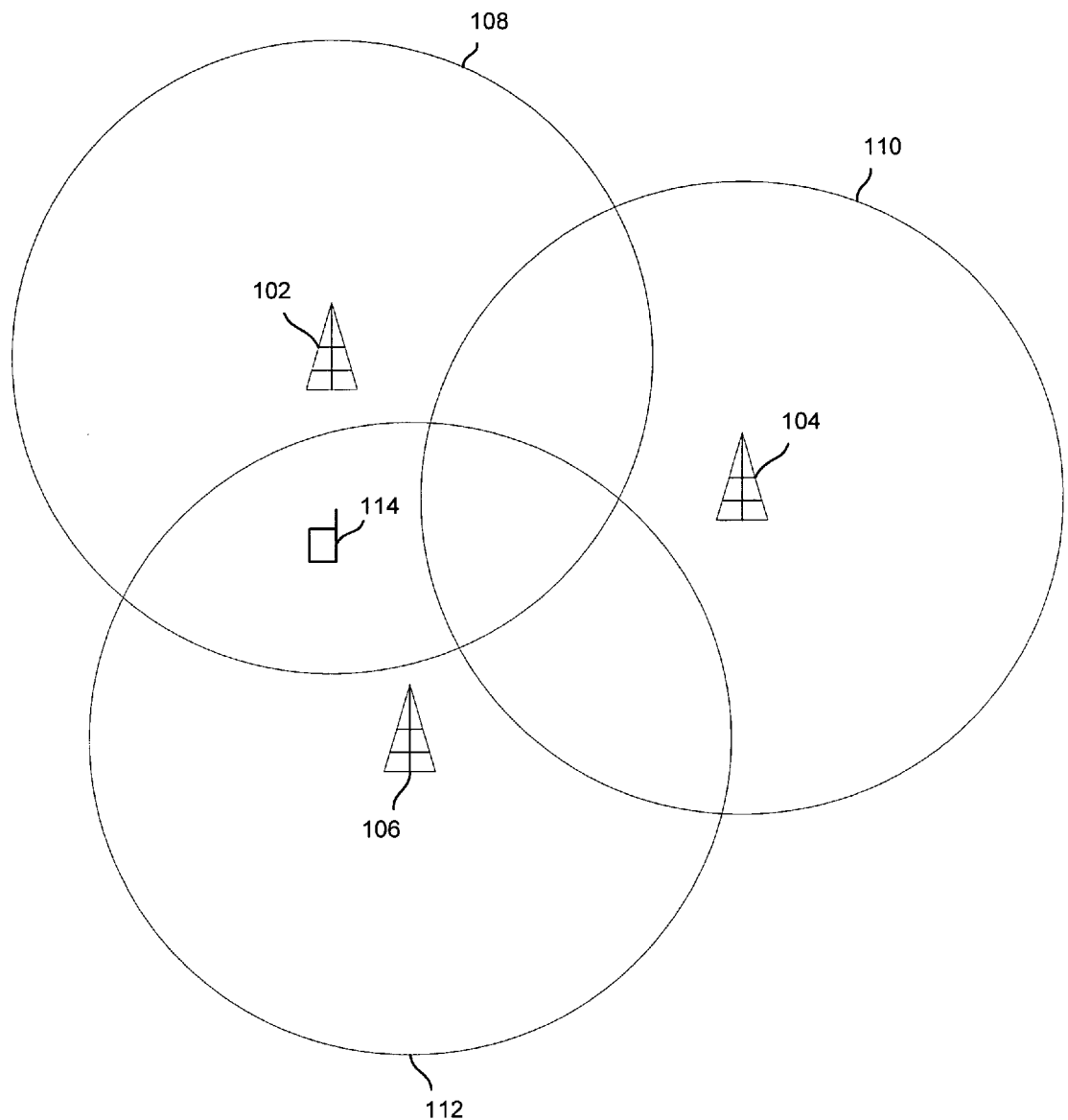
FIG. 1 is a block diagram illustrating an embodiment of a prior art array of base transceiver stations and their associated coverage areas.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Sensing a radio frequency (RF) environment to manage mobile network resources is disclosed. In some embodiments, a base transceiver station (BTS) or other mobile telecommunications network provider equipment senses a radio frequency environment in a location in which it is located. For example, a BTS or similar equipment that due to its size, weight, form factor, and/or manner of installation is capable of being moved from one location to another, and/or capable of being installed at a location potentially within and/or near the coverage area of one or more other base transceiver stations, such as a macro-BTS, senses the RF environment in the location in which it is located. Any beacon or other broadcast signals detected are used, as applicable, to assign one or more resources to the potentially movable BTS. An example of such a resource is a channel and/or frequency. In various embodiments, the assignment is made either by the potentially movable BTS itself, e.g., based on a selection algorithm in light of the sensed RF environment and/or the detected signal(s), if any, are reported to a coordinating node, such as a BSC and/or the core mobile network, configured to assign resources to the potentially movable BTS based on the RF environment observed and reported by the BTS. In some embodiments, the BTS selects a frequency or channel from a predetermined set of preconfigured and/or configurable options, based at least in part on the sensed RF environment. For example, in some embodiments the BTS selects a channel having an associated frequency or range or set of frequencies that is no closer than a prescribed minimum amount (e.g., 200 kHz) to any adjacent signal that could potential interfere with and/or be interfered with by the potentially movable BTS's signal. In other embodiments, the determining of a resource assignment is based, at least in part, on the sensed RF environment and includes selecting the assigned resource from a set of available resources. The selection of the assigned resources includes comparing the sensed RF environment to one or more resources that include the set of available resources.

FIG. 1 is a block diagram illustrating an embodiment of a prior art array of base transceiver stations and their associated coverage areas. Each of the base transceiver stations (BTS) 102, 104, and 106 has associated with it a corresponding geographic coverage area 108, 110, and 112, respectively, within which its signal is strong enough to be received and used by a mobile station (MS), such as MS 114, to communicate with the core mobile telecommunication network via that BTS. In areas in which two or more coverage areas overlap, an MS could in theory communicate with the core mobile network via any BTS having coverage in that area. Particularly in such regions in which coverage areas overlap, there is potential for inter-BTS interference. As a result, mobile telecommunications network providers typically have engaged radio frequency engineers to perform frequency planning tasks, such as to determine a scheme for allocating and assigning frequencies to base transceiver stations in the macrocellular network. The actual configuration of the base transceiver stations traditionally has been a largely manual process and the resulting assignments generally static.

Figure 2:
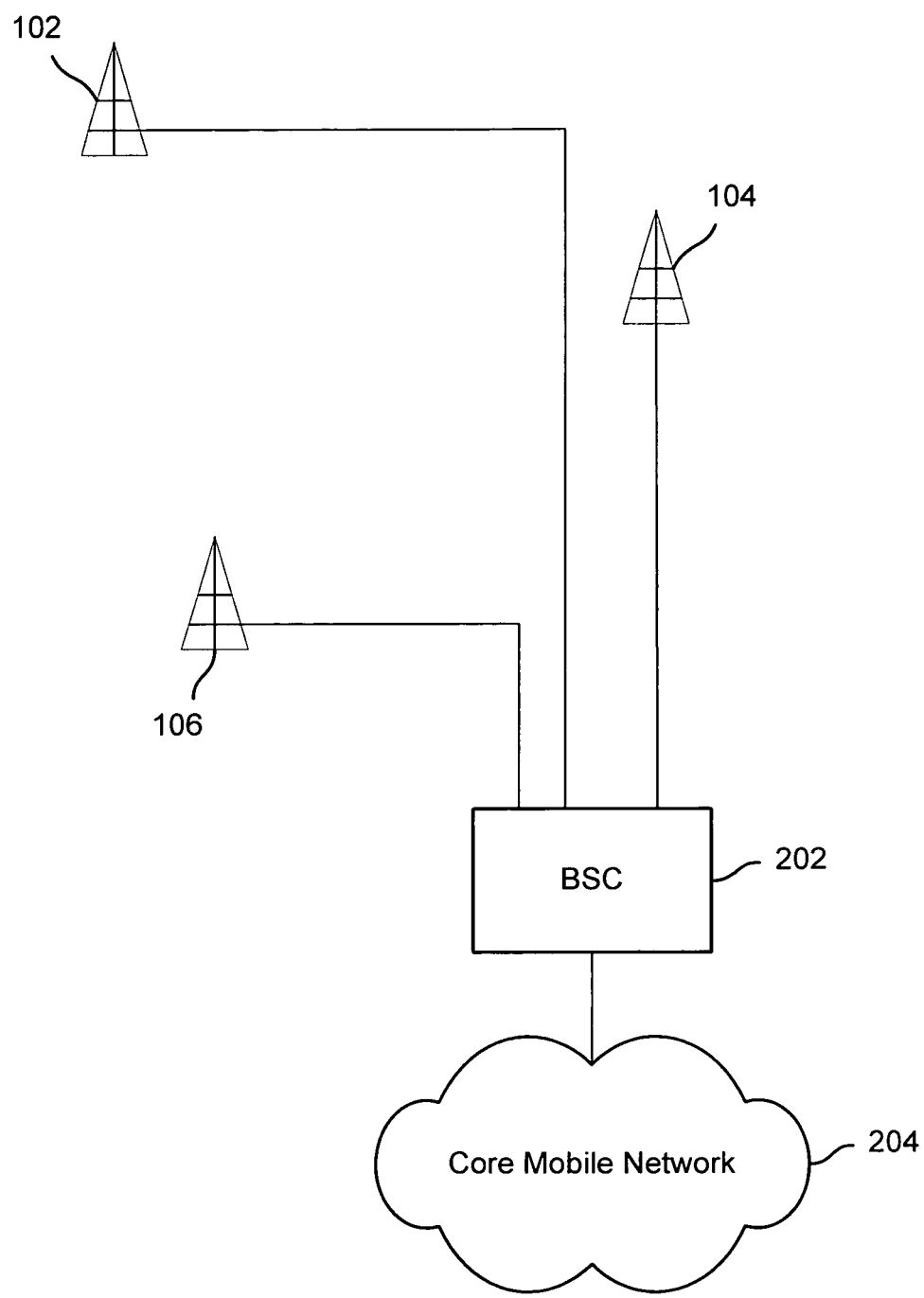
FIG. 2 is a block diagram illustrating an embodiment of base station subsystem elements in a typical prior art macro-cellular network.

FIG. 2 is a block diagram illustrating an embodiment of base station subsystem elements in a typical prior art macrocellular network. In the example shown, the BTS's 102, 104, and 106 of FIG. 1 are shown as each being connected to a base station controller (BSC) 202 via a corresponding dedicated communication link, typically a dedicated T-1/E-1 line. In a GSM network, the dedicated link is known as the Abis interface. The BSC 202 provides access to the core mobile network 204, in a GSM network typically via a mobile switching center (MSC) in the case of voice traffic and control messages and a serving GPRS support node (SGSN) in the case of packet data traffic.

Figure 3:
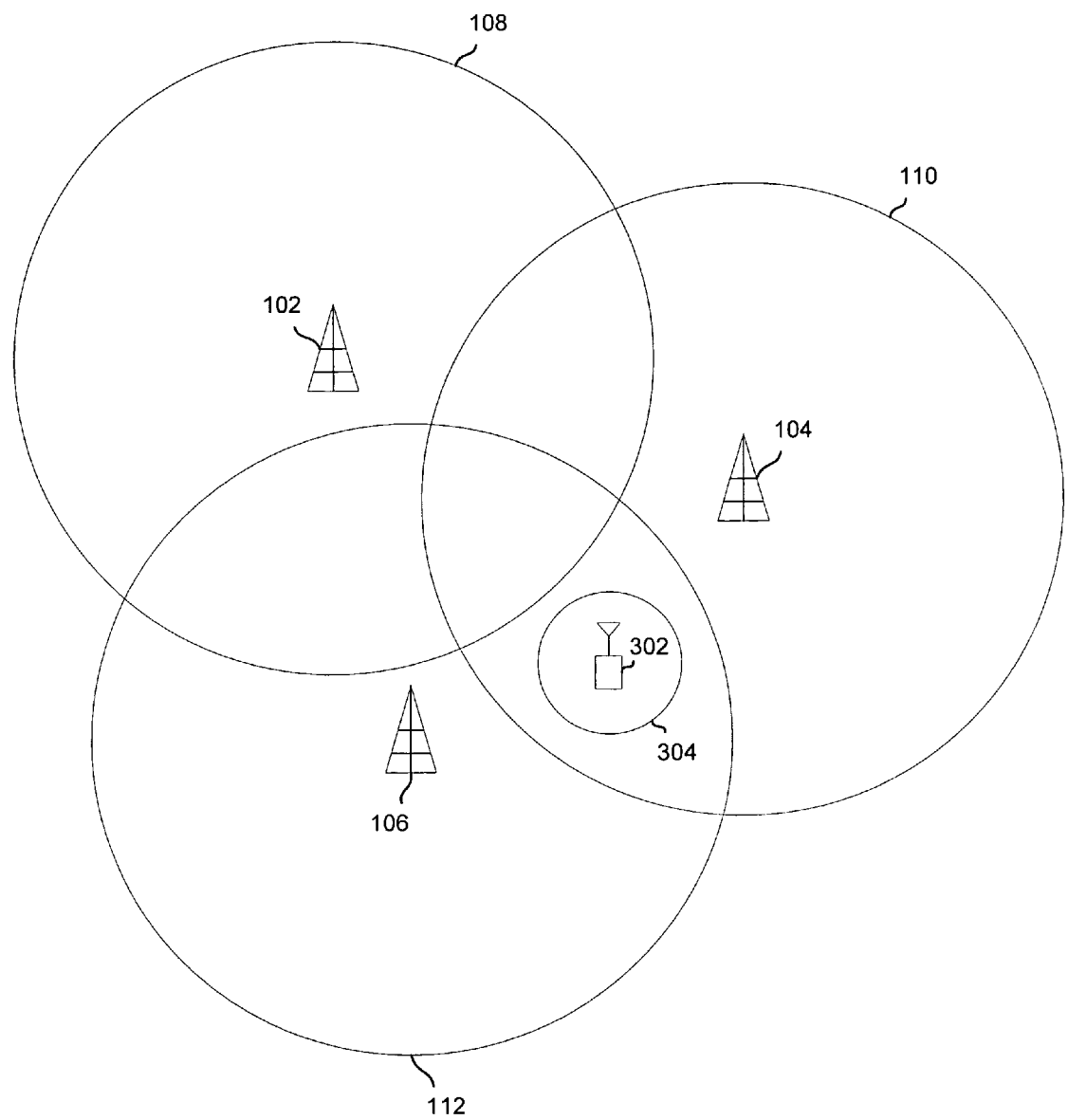
FIG. 3 is a block diagram illustrating an embodiment of a cellular network in which a small, potentially movable base transceiver station has been deployed.

FIG. 3 is a block diagram illustrating an embodiment of a cellular network in which a small, potentially movable base transceiver station has been deployed. In the example shown, a micro-, pico-, or femto-BTS 302 having an associated coverage area 304 has been deployed in the cellular network of FIG. 1, in a location such that a coverage area 304 overlaps with (and in this example, for clarity, is included entirely within) a region in which the coverage area 110 of BTS 104 and the coverage area 112 of BTS 106 overlap. In various embodiments, the potentially movable BTS 302 may be deployed by a customer or business partner (e.g., reseller, sales representative, retail outlet, etc.) of the mobile network provider, or by a relatively low skilled installation technician of the provider, under circumstances that make it infeasible, impractical, unduly costly, and/or inefficient to include the small scale BTS 302 in a frequency or other resource allocation and/or assignment plan for the cellular network. For example, the BTS 302 may be deployed long after the macrocell BTS's 102, 104, and 106. In addition, while one small scale BTS 302 is shown in FIG. 3, numerous such stations may be deployed in a densely populated area, e.g., in a high use area such as an airport or in many subscriber homes throughout a densely populated service area. The number, geographic distribution, and distribution of installation over time may make it impractical to integrate such small scale BTS's into frequency and/or other resource planning.

In some embodiments, each macrocell BTS supports up to 32 neighboring base stations on its neighbor list and each small scale base station is configured to operate at one of nine preconfigured channels/frequencies, e.g., one of nine absolute radio frequency channel numbers (ARFCN) in a GSM network, reserved in the network frequency planning process for use by micro-, pico-, and/or femto-BTS or other small and/or potential movable base transceiver stations.

Figure 4:
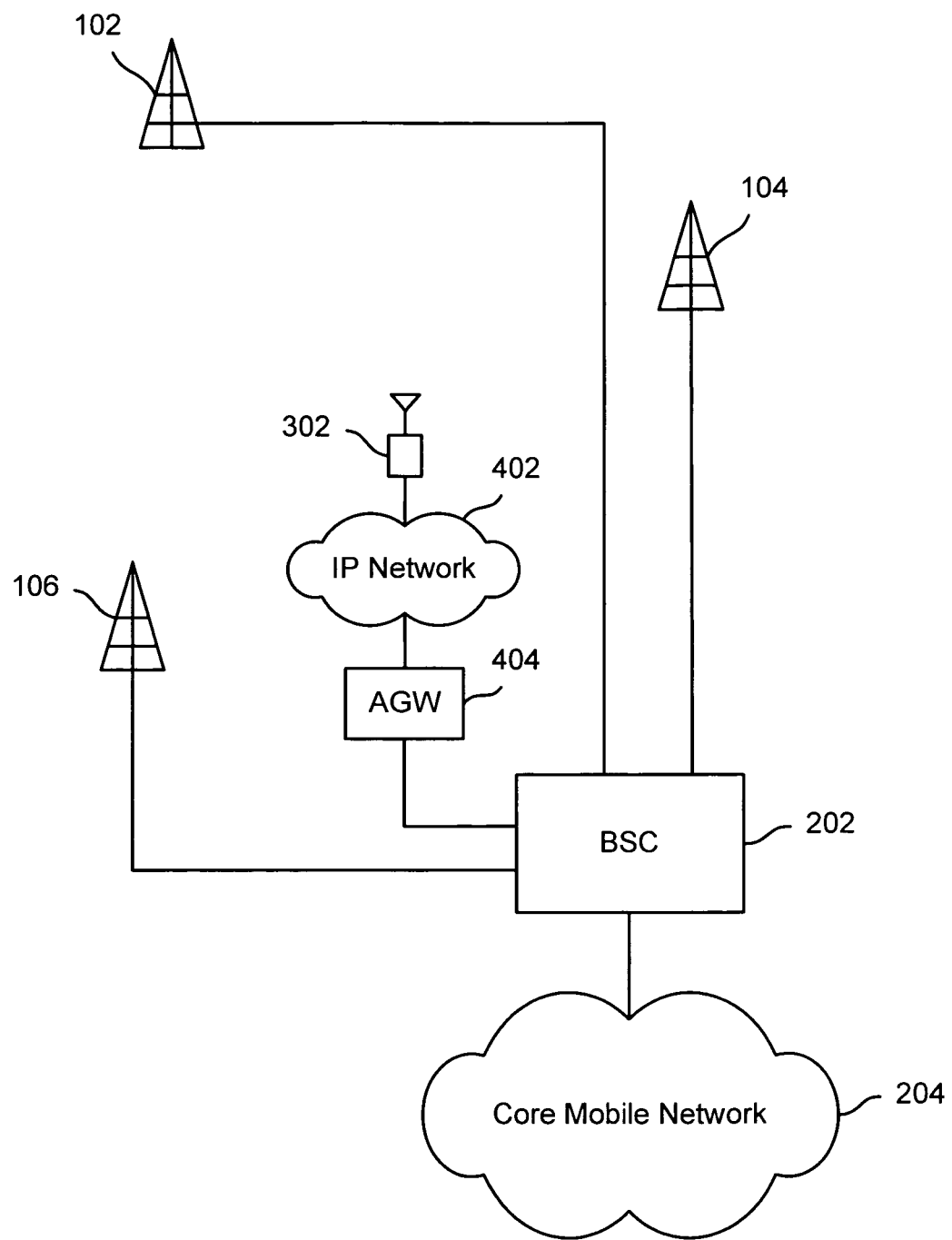
FIG. 4 is a block diagram illustrating an embodiment of a micro-, pico-, and/or femto-BTS or other small and/or potential movable base transceiver station with IP network backhaul.

FIG. 4 is a block diagram illustrating an embodiment of a micro-, pico-, and/or femto-BTS or other small and/or potential movable base transceiver station with IP network backhaul. As noted above, the macro-BTS's 102, 104, and 106 communicate with the core mobile network via a dedicated land line (e.g., T-1/E-1) to a BSC such as BSC 202. In FIG. 4, the small scale BTS 302 of FIG. 3 is shown as being connected to BSC 202 via an IP network 402 and an aggregation gateway (AGW) 404. In some embodiments, AGW 404 is configured to support one or more small scale BTS's such as BTS 302, aggregating their traffic and translating traffic sent via the IP network 402 using a suitable protocol, e.g., the real-time transport protocol (RTP) for voice traffic, to the Abis (for GSM) or similar interface to the BSC (or equivalent node in a non-GSM network), and vice versa. As high-speed Internet access for homes and small businesses becomes more and more ubiquitous, it has become and will continue to become more and more possible to deploy small scale base stations in homes and businesses, and use IP backhaul to provide connectivity to the core mobile network, avoiding the cost and waste of bandwidth that would attend if each such base station required a dedicated T-1/E-1 or other high capacity connection.

Figure 5A:
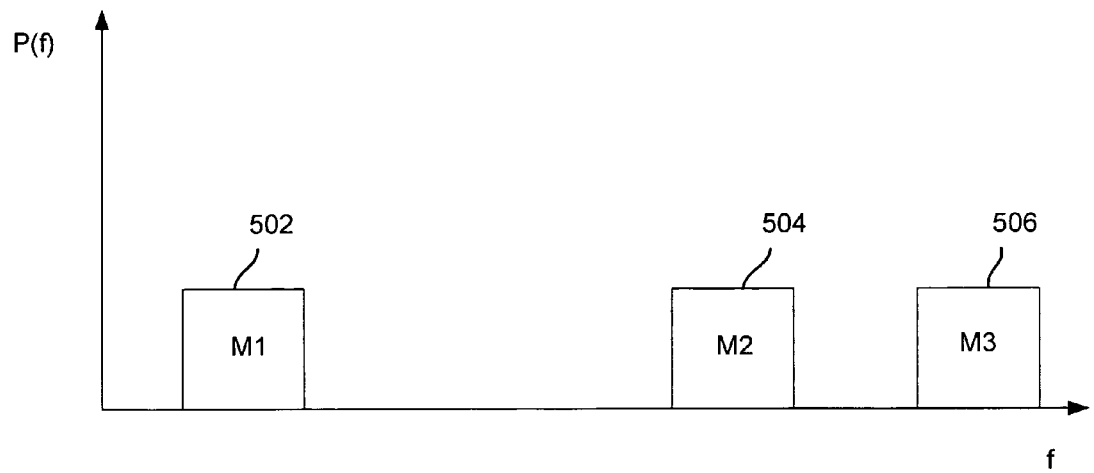
FIG. 5A shows an illustrative frequency assignment scheme for the cellular network as shown in FIG. 1.

FIG. 5A shows an illustrative frequency assignment scheme for the cellular network as shown in FIG. 1. A first range of frequencies 502 associated with a first channel has been assigned, for example, to BTS 102; a second range of frequencies 504 associated with a second channel has been assigned, for example, to BTS 104; and a third range of frequencies 506 associated with a third channel has been assigned, for example, to BTS 106. The frequency ranges 502, 504, and 506 are spaced from each other by at least a prescribed minimum spacing, e.g., 200 kHz in the case of a GSM network.

Figure 5B:
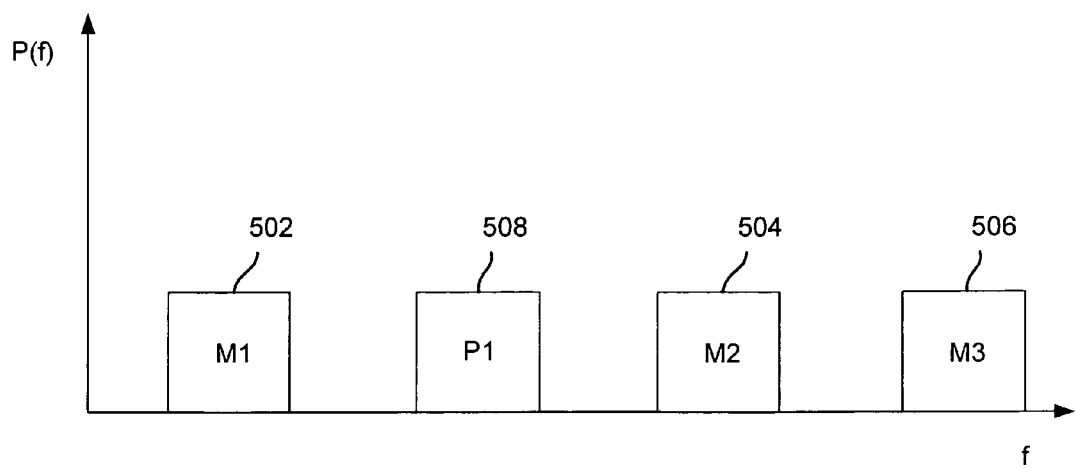
FIG. 5B shows an embodiment of the frequency assignment scheme of FIG. 5A as modified to reflect assignment of a fourth frequency range to a small scale base station.

FIG. 5B shows an embodiment of the frequency assignment scheme of FIG. 5A as modified to reflect assignment of a fourth frequency range to a small scale base station. In the example shown, a fourth frequency range 508 has been assigned to the small scale base station 302 of FIG. 3. A frequency range for a small scale, such as fourth frequency range 508 in the example shown, is selected in some embodiments to ensure a prescribed minimum spacing (e.g., 200 kHz) from adjacent macrocellular and/or small scale base stations (BTS's) operating in or near the location in which the small scale base station is located.

Sensing an RF environment to manage mobile network resources, such as available channels/frequencies, is disclosed. In some embodiments, a small scale BTS such as BTS 302 of FIG. 3 includes an RF sensing (or "sniffing") subsystem. On startup (and/or at other prescribed times and/or conditions), the small scale BTS senses the RF environment in the location in which it is located. In some embodiments, the small scale BTS scans a relevant range of frequencies, such as the 900/1800 and 850/1900 MHz bands in the case of a small scale base station or other equipment associated with a GSM network. In some embodiments, the small scale base station or other equipment includes an RF monitor comprising a GSM or other receiver capable of receiving in one or more bands of interest. In some embodiments, the BTS at least partly evaluates the sensed RF environment, e.g., by determining which sensed signals are of interest (e.g., because they are known to be or may be associated with an adjacent BTS from the same or another mobile network). In some embodiments, the determination is made based at least in part on the beacon frequency at which a broadcast channel is transmitted. In some embodiments, the determination is made based at least in part on information included in such a beacon or broadcast channel.

In some embodiments, the BTS is configured to select, from a preconfigured set of options, a channel to be used by the BTS. In the example described above, a BTS may be configured to select, from one of nine (or more or fewer than nine in other embodiments) preconfigured channels, a channel associated with frequencies that are at least a prescribed minimum spacing (e.g., 200 kHz in a GSM network or other prescribed or desired spacing as required in a network other than a GSM network) from the frequencies associated with the nearest (in frequency) adjacent BTS as determined by sensing the RF environment.

Figure 6:
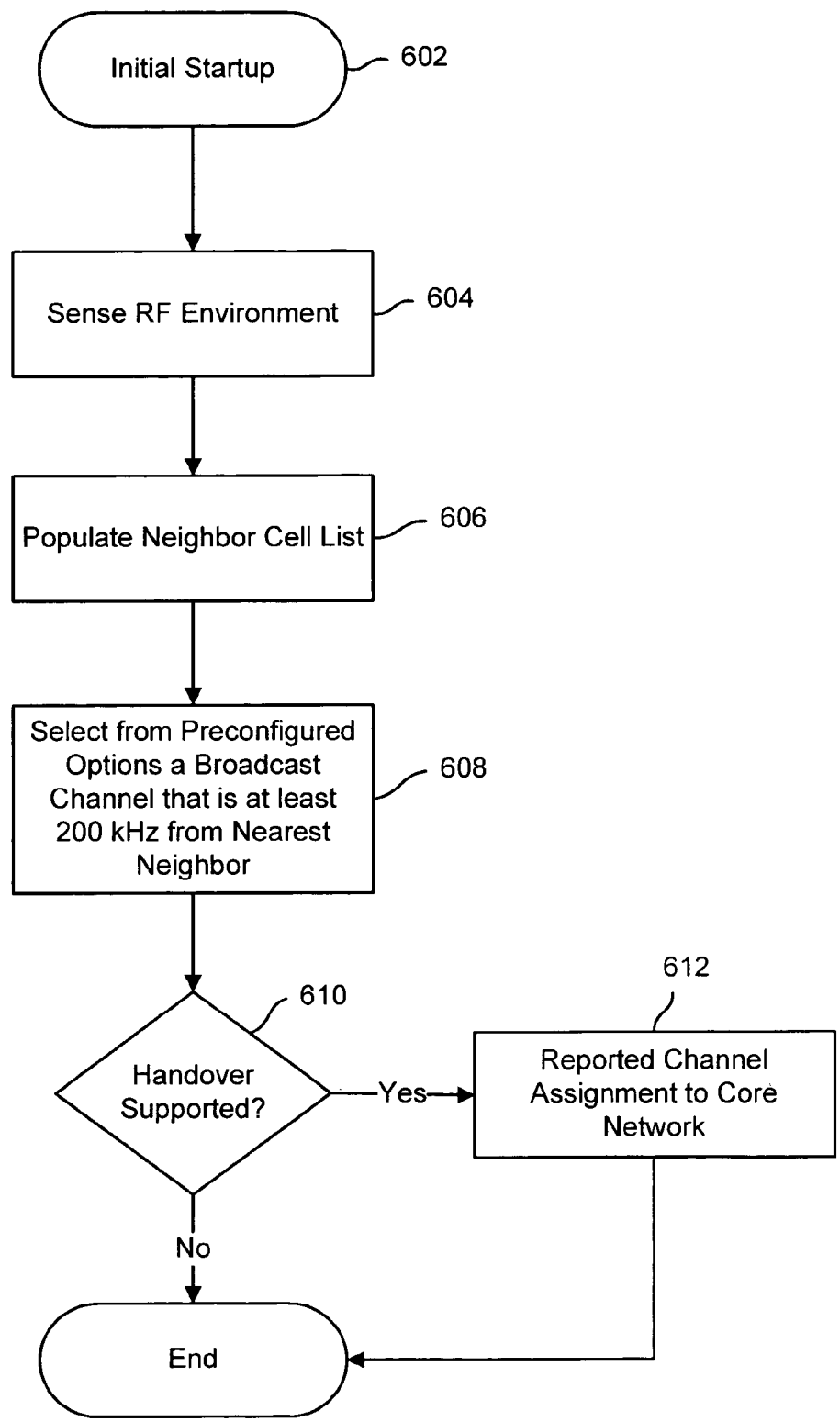
FIG. 6 is a flow chart illustrating an embodiment of a process for assigning mobile network resources, in this example a channel/range of frequencies, at least in part by sensing an RF environment.

FIG. 6 is a flow chart illustrating an embodiment of a process for assigning mobile network resources, in this example a channel/range of frequencies, at least in part by sensing an RF environment. In some embodiments, the process of FIG. 6 is implemented by a small scale BTS, such as BTS 302 of FIG. 3. In the example shown, at initial startup 602, the RF environment is sensed 604. A neighbor cell list is populated 606. In various embodiments, 606 is optional and/or omitted. At 608, a broadcast (or other) channel that would result in at least a prescribed minimum (in this example 200 kHz) spacing from the nearest sensed RF source (e.g., macro-BTS) is selected from a set of preconfigured options. If handover is supported 610, the channel selected is reported to the core mobile network 612. If handover is not supported 610 or after the channel selection/assignment has been reported 612, the process ends.

In some embodiments, the small scale BTS selects and proposes a channel but does not configure itself to broadcast on that channel unless/until an assignment, acknowledgement, and/or confirmation is received from the core mobile network. In some embodiments, the small scale BTS senses the RF environment and reports either the raw and/or at least partly evaluated and/or classified RF environment data to the core mobile network, or some auxiliary element, which then assigns a channel, frequency, and/or other resource(s) based at least in part on the RF environment as sensed and reported by the small scale BTS.

Figure 7:
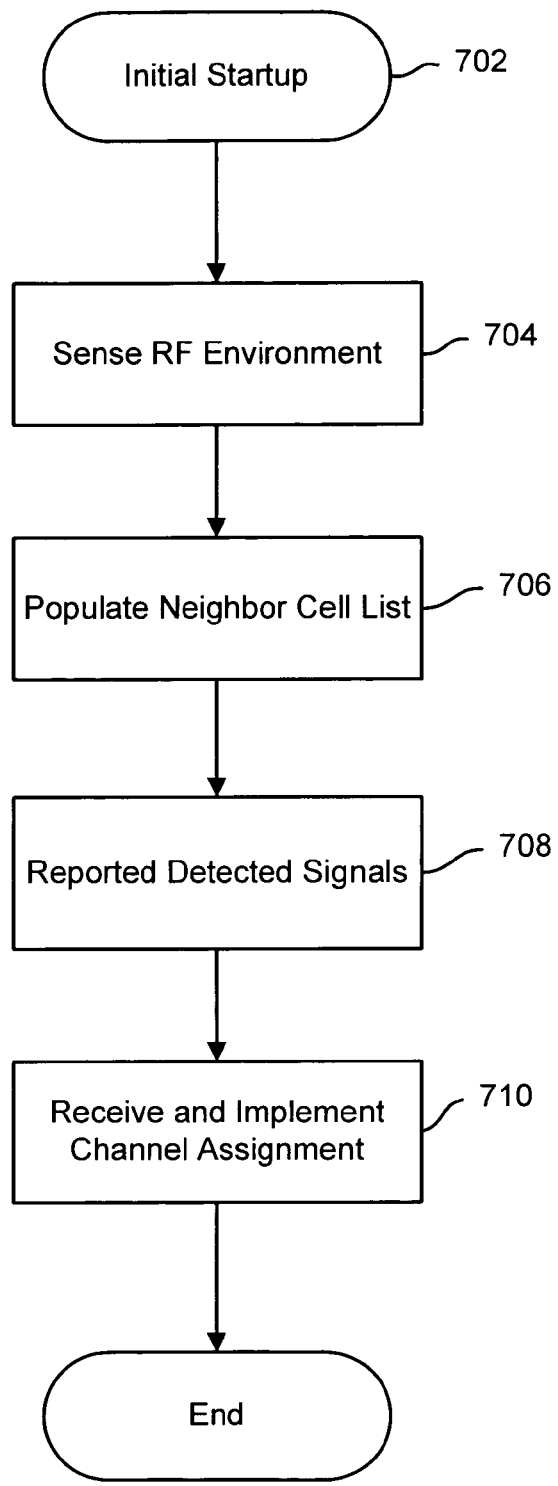
FIG. 7 is a flow chart illustrating an embodiment of a process for assigning mobile network resources, in this example a channel/range of frequencies, at least in part by sensing an RF environment.

FIG. 7 is a flow chart illustrating an embodiment of a process for assigning mobile network resources, in this example a channel/range of frequencies, at least in part by sensing an RF environment. In some embodiments, the process of FIG. 7 is implemented by a small scale BTS, such as BTS 302 of FIG. 3. In the example shown, at initial startup 702, the RF environment is sensed 704. A neighbor cell list is populated 706. In various embodiments, 706 is optional and/or omitted. Signals detected at 704 are reported 708, e.g., to a core mobile network via BSC. A channel (and/or other resource) assignment is received, e.g., from the core mobile network, and implemented 710.

While in many of the examples described in detail above involve frequency assignment in a GSM or similar network, the techniques described herein may be used to manage any resource capable of being managed based at least in part on information obtained by sensing the RF environment, in a GSM or other network. For example, in a UMTS or other CDMA network the techniques described herein are used in some embodiments to assign codes to a small scale base station or other element. In some embodiments, at startup a small scale UMTS base station senses the RF environment, determines if any signals associated with an adjacent base station are detected, and determine for each detected signal what code(s) is/are being used by the associated base station. The small scale base station in some embodiments selects, from a preconfigured set of options, a code that is not already being used by an adjacent base station, as determined by sensing the RF environment.

In various embodiments, managing mobile network resources based at least in part on an RF environment as sensed by a small scale BTS or other equipment provides flexibility and saves cost in connection with deploying distributed and/or small scale infrastructure elements, such as small scale base stations intended for home or enterprise use.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method of managing a mobile network resource, comprising:
   sensing, by a first base transceiver station, a radio frequency environment to detect a signal broadcast by a second base transceiver station;
   preconfiguring the first base transceiver station to operate in accordance with absolute radio frequency channel numbers reserved in a network frequency planning process (reserved ARFCN) for use by the first base transceiver station;
   evaluating, by the first base transceiver station, the sensed radio frequency environment by determining which sensed signals are of interest;
   determining, by the first base transceiver station, a resource assignment based, at least in part, on the evaluated radio frequency environment and a prescribed rule, wherein the determining of the resource assignment comprises selecting at least one of the reserved ARFCNs to configure the first base transceiver station based, at least in part, on the evaluated radio frequency environment; and
   implementing, by the first base transceiver station, the resource assignment:
   wherein the first base transceiver station is a small scale base transceiver station, wherein an aggregation gateway aggregates traffic from a plurality of small scale base transceiver stations that communicate over an IP network to reach the aggregation gateway, and wherein the aggregation gateway sends the aggregated traffic from the plurality of small scale base transceiver stations to a base station controller.

2. The method according to claim 1, wherein the second base transceiver station comprise a macrocellular base transceiver station configured to provide access to cellular telecommunication service to mobile stations located in a coverage area of the macrocellular base transceiver station.

3. The method according to claim 1, wherein sensing the radio frequency environment further comprises determining a carrier frequency of said sensed signals.

4. The method according to claim 1, further comprising populating a neighbor cell list with data associated with said second base transceiver station.

5. The method according to claim 1, wherein the resource comprises a frequency or a range of frequencies.

6. The method according to claim 1, wherein the resource comprises a code.

7. The method according to claim 1, wherein the resource comprises a channel.

8. The method according to claim 1, wherein determining the resource assignment based, at least in. part, on the evaluated radio frequency environment comprises determining that the assigned resource is not already in use by said second base transceiver station.

9. The method according to claim 1, wherein determining the resource assignment based, at least in part, on the evaluated radio frequency environment comprises selecting the assigned resource from a set of available resources.

10. The method according to claim 9, wherein selecting the assigned resource from the set of available resources comprises comparing the evaluated radio frequency environment to at least one resource comprising the set of available resources.

11. The method according to claim 1, wherein the assigned resource is determined by a node to which the resource is to be assigned.

12. The method according to claim 11, wherein the node reports the assigned resource to the mobile network.

13. The method according to claim 1, wherein the first base transceiver station comprises at least one of the following; a small scale base transceiver station, a portable base transceiver station, a micro-base transceiver station, a pico-base transceiver station, and a femto-base transceiver station.

14. The method according to claim 1, comprising:
if handover is supported, reporting, by the first base transceiver station, the selected ARFCN to a core mobile network; and
if handover is not supported not reporting, by the first base transceiver station, the selected ARFCN to the core mobile network.

15. The method according to claim 1, wherein the prescribed rule defines a minimum frequency spacing from frequencies associated with a nearest other base transceiver station.

16. The method according to claim 1, wherein evaluating the sensed radio frequency environment by determining a sensed signal of interest further comprises factoring in a frequency of at least one of the second base transceiver station's signals.

17. The method according to claim 1, wherein evaluating the radio frequency environment by determining a sensed signal of interest further comprises factoring in an information in at least one of the second base transceiver station's signals.

18. A wireless communication device, comprising:
an antenna; and
a processor configured to use the antenna to sense a radio frequency environment to detect a signal broadcast by a base transceiver station, to evaluate the sensed radio frequency environment by determining a sensed signal of interest, to determine a proposed resource assignment based, at least in part, on the evaluated radio frequency environment, and to implement the proposed resource assignment,
wherein the wireless communication device is preconfigured to operate in accordance with absolute radio frequency channel numbers reserved in a network frequency planning process (reserved ARFCNs) for use by the wireless communication device,
wherein the determining of the proposed resource assignment comprises selecting at least one of the reserved ARFCNs with which to configure the wireless communication device based, at least in part, on the evaluated radio frequency environment and a prescribed rule,
wherein the wireless communication device sends the proposed resource assignment to a base station controller through an IP network and an aggregation gateway, the aggregation gateway receiving traffic over the IP network from a plurality of small scale base transceiver stations including the wireless communication device, the aggregation gateway sending the aggregated traffic from the plurality of small scale base transceiver stations to the base station controller, and
wherein the wireless communication device does not configure itself and awaits assignment of the at least one selected ARFCN from the base station controller.

19. The wireless communication device according to claim 18, wherein the wireless communication device sends the proposed resource assignment to the base station controller if handover is supported.

20. The wireless communication device according to claim 18, wherein at least one of the selected ARFCNs do not configure the wireless communication device to transmit or receive within 200 kHz of channels being used by other base transceiver stations that are part of the evaluated radio frequency environment.

21. The wireless communication device according to claim 18, wherein the wireless communication device is a first small scale base transceiver station, wherein the first small scale transceiver station and a second small scale base transceiver station are coupled to an aggregation gateway via an IP network, wherein the aggregation gateway aggregates traffic from the first small scale transceiver station and the second small scale base transceiver station and sends the aggregated traffic to a base station controller via an Abis interface.

22. A system of managing a mobile network resource, comprising:
a first small scale base transceiver station that senses a radio frequency environment to detect a signal broadcast by a second base transceiver Station,
wherein the first small scale base transceiver station is preconfigured to use at least one channel or frequency reserved during a network frequency planning process for use by the first small scale base transceiver station,
wherein the first small scale base transceiver station evaluates the sensed radio frequency environment by determining a sensed signal of interest,
wherein the first small scale base transceiver station reports evaluated radio frequency environment data to a base station controller through an IP network and an aggregation gateway, the aggregation gateway receiving traffic over the IP network from a plurality of small scale base transceiver stations including the first small scale base transceiver station, the aggregation gateway aggregating the traffic from the plurality of small scale transceiver stations and sending the aggregated traffic to the base station controller,
wherein the base station controller determines a resource assignment based, at least in part, on the sensed radio frequency environment and a prescribed rule, and wherein the determining of the resource assignment comprises selecting at least one of the reserved channels or frequencies to configure the first small scale base transceiver station based, at least in part, on the evaluated radio frequency environment.

* * * * *